US012561965B2

(12) United States Patent (10) Patent No.: US 12,561,965 B2
Lvov et al. (45) Date of Patent: Feb. 24, 2026

(54) NEURAL NETWORK CACHING FOR VIDEO

(71) Applicant: Synaptics Incorporated, San Jose, CA
(US)

(72) Inventors: Dmitri Lvov, Ramat Hasharon (IL);
Maor Shliefer, Herzliya (IL)

(73) Assignee: Synaptics Incorporated, San Jose, CA
(US)

( * ) Notice: Subject to any disclaimer, the term of this
patent is extended or adjusted under 35
U.S.C. 154(b) by 514 days.

(21) Appl. No.: 18/069,781

(22) Filed: Dec. 21, 2022

(65) Prior Publication Data

US 2024/0212333 A1     Jun. 27, 2024

(51) Int. Cl.
 *G06V 10/82* (2022.01)
 *G06V 10/74* (2022.01)
(52) U.S. Cl.
 CPC ............ *G06V 10/82* (2022.01); *G06V 10/761*
(2022.01)
(58) Field of Classification Search
 CPC ...... G06V 10/82; G06V 10/761; G06V 20/41;
 G06V 10/762; G06V 10/25; G06T
 2207/20081; G06T 2207/10016; G06N
 3/0464
 See application file for complete search history.

(56) References Cited

U.S. PATENT DOCUMENTS

2018/0317851 A1* 11/2018 Jia ......................... A61B 5/0066
2022/0108551 A1*  4/2022 Athreya ................. H04N 25/47

OTHER PUBLICATIONS

Cavigelli, Lukas et al. "CBinfer: Change-Based Inference for Con-
volutional Neural Networks on Video Data." Proceedings of the
11th International Conference on Distributed Smart Cameras (2017):
n. pag. (Year: 2017).*
Habibian et al., "Skip-Convolutions for Efficient Video Processing,"
https://arxiv.org/pdf/2104.11487.pdf, 1-11 pages. 2021.

* cited by examiner

*Primary Examiner* — Andrew M Moyer
*Assistant Examiner* — Ahmed A Nasher
(74) *Attorney, Agent, or Firm* — Paradice & Li LLP

(57) ABSTRACT

This disclosure provides methods, devices, and systems for
machine learning. The present implementations more spe-
cifically relate to techniques for reducing the computational
load of a convolutional neural network (CNN) when pro-
cessing successive video frames. In some aspects, a machine
learning system may cache or store the outputs (also referred
to as "activations") produced by one or more layers of a
CNN so that one or more cached activations can be substi-
tuted for respective activations that would otherwise be
computed by the CNN when processing a subsequent video
frame. For example, the machine learning system may
compare each video frame with a preceding frame of the
video to detect pixels that undergo significant changes
between successive frames (also referred to as "motion
pixels"). In some aspects, the CNN may only perform neural
network operations that involve one or more motion pixels
or features derived from a motion pixel.

18 Claims, 7 Drawing Sheets

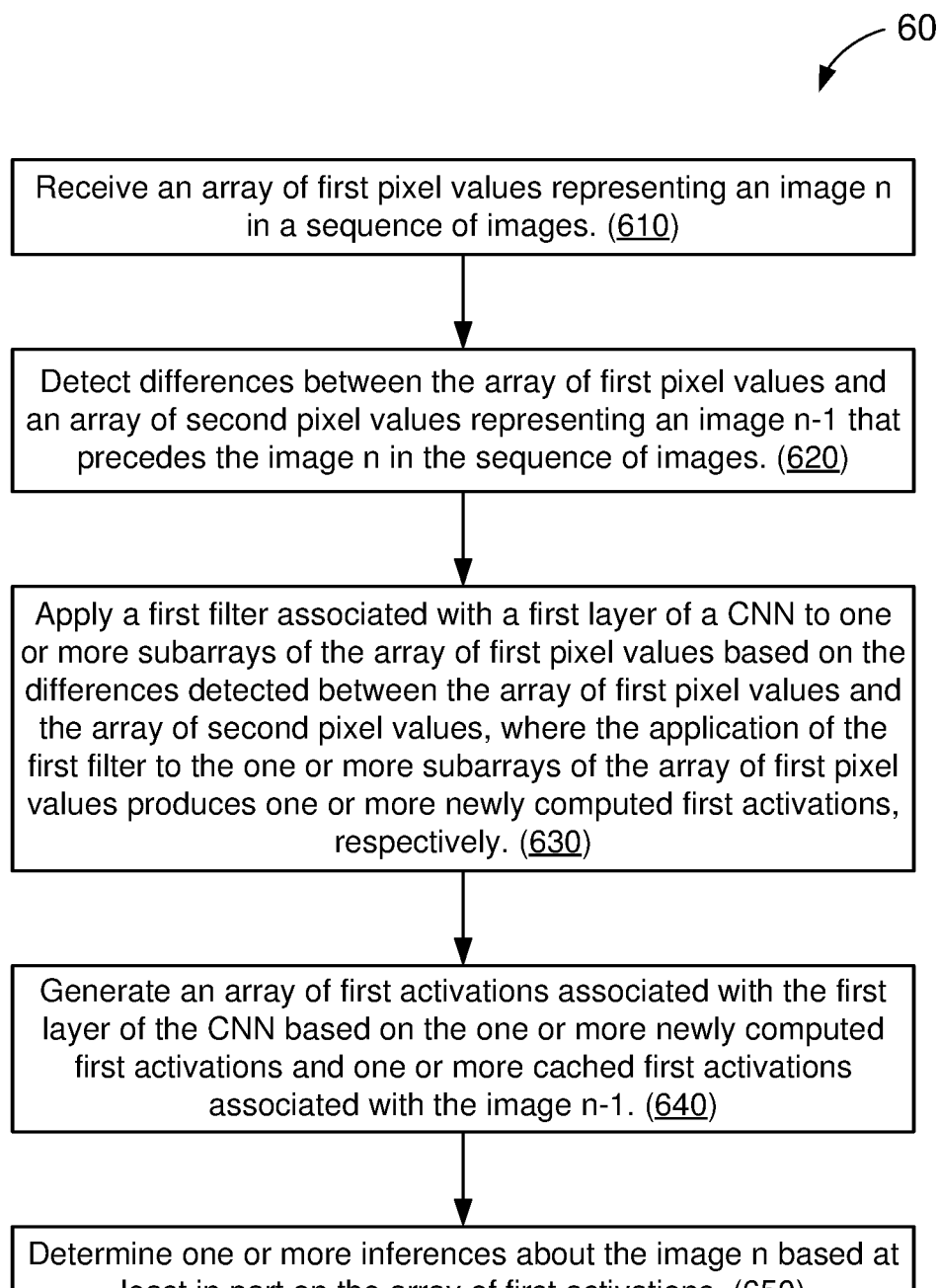

600

Receive an array of first pixel values representing an image n in a sequence of images. (610)

Detect differences between the array of first pixel values and an array of second pixel values representing an image n-1 that precedes the image n in the sequence of images. (620)

Apply a first filter associated with a first layer of a CNN to one or more subarrays of the array of first pixel values based on the differences detected between the array of first pixel values and the array of second pixel values, where the application of the first filter to the one or more subarrays of the array of first pixel values produces one or more newly computed first activations, respectively. (630)

Generate an array of first activations associated with the first layer of the CNN based on the one or more newly computed first activations and one or more cached first activations associated with the image n-1. (640)

Determine one or more inferences about the image n based at least in part on the array of first activations. (650)

FIG. 6

NEURAL NETWORK CACHING FOR VIDEO

TECHNICAL FIELD

The present implementations relate generally to machine learning, and specifically to neural network caching techniques for video applications.

BACKGROUND OF RELATED ART

Computer vision is a field of artificial intelligence (AI) that uses machine learning to draw inferences about an environment from images of the environment. Example computer vision applications include object detection, object classification, and object tracking, among other examples. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules that can be used to describe each of the one or more answers. During the inferencing phase, the machine learning system may infer answers from new data using the learned set of rules.

Deep learning is a particular form of machine learning in which the inferencing (and training) phases are performed over multiple layers, producing a more abstract representation of the input in each successive layer. Deep learning architectures are often referred to as "artificial neural networks" due to the manner in which information is processed (similar to a biological nervous system). For example, each layer of an artificial neural network may be composed of one or more "neurons." The neurons may be interconnected across the various layers so that the input data can be processed and passed from one layer to another. More specifically, each layer of neurons may perform a different transformation on the output data from a preceding layer so that the final output of the neural network results in a desired inference. The transformations associated with the interconnected framework of neurons is referred to as a "neural network model."

A convolutional neural network (CNN) is a particular type of artificial neural network that processes data in a manner similar to the human visual system. For example, each neuron in a CNN responds to a respective subset of the data from a previous layer located within its "receptive field." The receptive fields of the neurons in a given layer are combined to cover the entire input from the previous layer (similar to how the receptive fields of cortical neurons in the brain cover the entire visual field). As such, CNNs are well-suited for computer vision applications. Many existing CNNs require intensive processing power to achieve accurate inferencing results. However, computer vision is often used in low power video applications (such as battery-powered cameras). Thus, there is a need to reduce the power consumption of machine learning architectures used in computer vision applications.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of inferencing. The method includes steps of receiving an array of first pixel values representing an image n in a sequence of images; detecting differences between the array of first pixel values and an array of second pixel values representing an image n–1 that precedes the image n in the sequence of images; applying a first filter associated with a first layer of a convolutional neural network (CNN) to one or more subarrays of the array of first pixel values based on the differences detected between the array of first pixel values and the array of second pixel values, where the application of the first filter to the one or more subarrays of the array of first pixel values produces one or more newly computed activations, respectively; generating an array of activations associated with the first layer of the CNN based on the one or more newly computed activations and one or more cached activations associated with the image n–1; and determining one or more inferences about the image n based at least in part on the array of activations.

Another innovative aspect of the subject matter of this disclosure can be implemented in a machine learning system including a processing system and a memory. The memory stores instructions that, when executed by the processing system, causes the machine learning system to receive an array of first pixel values representing an image n in a sequence of images; detect differences between the array of first pixel values and an array of second pixel values representing an image n–1 that precedes the image n in the sequence of images; apply a first filter associated with a first layer of a CNN to one or more subarrays of the array of first pixel values based on the differences detected between the array of first pixel values and the array of second pixel values, where the application of the first filter to the one or more subarrays of the array of first pixel values produces one or more activations, respectively; generate an array of activations associated with the first layer of the CNN based on the one or more activations and one or more cached activations associated with the image n–1; and determine one or more inferences about the image n based at least in part on the array of activations.

BRIEF DESCRIPTION OF THE DRAWINGS

The present embodiments are illustrated by way of example and are not intended to be limited by the figures of the accompanying drawings.

FIG. 6 shows an illustrative flowchart depicting an example inferencing operation, according to some implementations.

DETAILED DESCRIPTION

Figure 1:
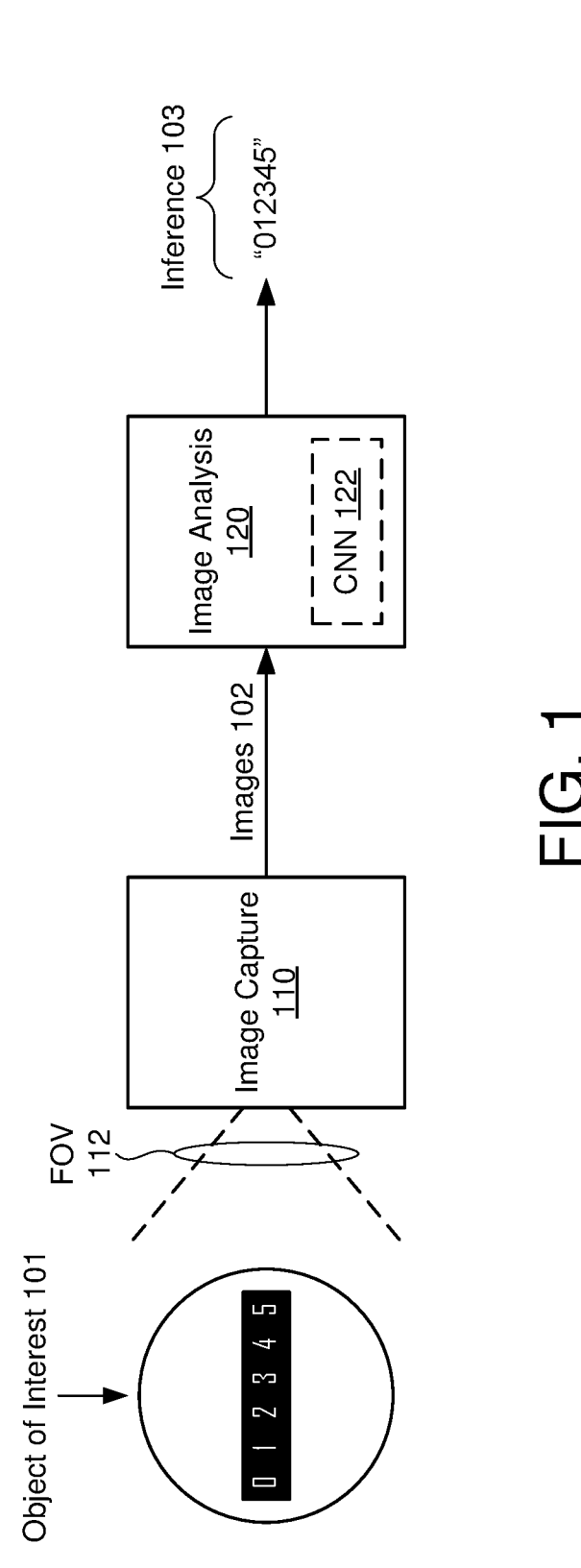
FIG. 1 shows a block diagram of an example computer vision system, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, a convolutional neural network (CNN) is a particular type of artificial neural network that processes data in a manner similar to the human visual system. Accordingly, CNNs are well-suited for computer vision applications. Many existing CNNs require intensive processing power to achieve accurate inferencing results. However, computer vision is often used in low power video applications (such as battery-powered cameras). Aspects of the present disclosure recognize that adjacent frames of video (such as images captured successively in time) are often the same or substantially similar in appearance. In other words, at least some of the pixel values in adjacent video frames may exhibit little or no change. As such, many of the computations performed by CNNs in existing computer vision applications may be redundant. Aspects of the present disclosure further recognize that the power consumption of a CNN can be reduced, without loss of accuracy, by avoiding redundant computations on pixel values that remain unchanged.

Various aspects relate generally to machine learning, and more particularly, to reducing the computational load of a neural network when processing successive frames of video in accordance with a computer vision application. In some aspects, a machine learning system may cache or store the outputs (also referred to as "activations") produced by one or more layers of a CNN so that one or more cached activations can be substituted for respective activations that would otherwise be computed by the CNN when processing a subsequent frame of video. More specifically, the CNN may use the cached activations in lieu of performing various neural network operations (such as convolution, pooling, or pixel-wise operations) on image pixels (and their derivatives) that remain substantially unchanged between successive video frames. For example, the machine learning system may compare each video frame with a preceding frame in the sequence to detect pixels that undergo significant changes between successive frames (also referred to as "motion pixels"). In some aspects, the CNN may only perform neural network operations that involve one or more motion pixels or activations derived from a motion pixel.

Particular implementations of the subject matter described in this disclosure can be implemented to realize one or more of the following potential advantages. By caching the activations produced by one or more layers of a CNN, aspects of the present disclosure may substantially reduce the number of computations performed by the CNN when processing successive frames of video. More specifically, the CNN may avoid redundant computations by substituting cached activations for activations that would otherwise be computed based on image pixels (or their derivates) that remain substantially unchanged between successive video frames. The reduction in computation load also reduces the power consumption of the CNN. Accordingly, the machine learning systems of the present disclosure may be well-suited for low power computer vision applications.

FIG. 1 shows a block diagram of an example computer vision system 100, according to some implementations. In some aspects, the computer vision system 100 may be configured to generate inferences about one or more objects of interest (also referred to as "target objects"). In the example of FIG. 1, an object of interest 101 is depicted as a device capable of displaying a dynamic sequence of digits or numbers (such as a water meter, an electrical meter, or any other digital or analog metering device). In some other implementations, the computer vision system 100 may be configured to generate inferences about various other objects of interest in addition to, or in lieu of, the object of interest 101.

The system 100 includes an image capture component 110 and an image analysis component 120. The image capture component 110 may be any sensor or device (such as a camera) configured to capture a pattern of light in its field-of-view (FOV) 112 and convert the pattern of light to a digital image 102. For example, the digital image 102 may include an array of pixels (or pixel values) representing the pattern of light in the FOV 112 of the image capture component 110. In some implementations, the image capture component 110 may continuously (or periodically) capture a series of images 102 representing a digital video. As shown in FIG. 1, the object of interest 101 is located within the FOV 112 of the image capture component 110. As a result, the digital images 102 may include the object of interest 101.

The image analysis component 120 is configured to produce one or more inferences 103 based on the digital images 102. In some aspects, the image analysis component 120 may generate inferences about the object of interest 101 depicted in the image 102. For example, the image analysis component 120 may detect the object of interest 101 in the digital image 102 and infer the numbers displayed thereon. In other words, the image analysis component 120 may output a numerical value (such as "012345"), as an inference 103, representing an interpretation or reading of the digits displayed by the object of interest 101. In some aspects, the numbers displayed by the object of interest 101 may change over time, for example, based on water or electricity usage.

Accordingly, the image analysis component 120 may produce different inferences 103 in response to images 102 captured at different times.

In some implementations, the image analysis component 120 may generate the inference 103 based on a convolutional neural network (CNN) 122. For example, the CNN 122 may be trained to read the digits displayed by the object of interest 101 by providing the CNN 122 with a large number of images depicting the object of interest 101 (or similar objects) and contextual information indicating the actual values of the digits displayed by the object of interest 101 in each image. The CNN 122 may perform statistical analysis on the received images to determine a common set of features that can be associated with each number or digit that can be displayed by the object of interest 101. More specifically, the CNN 122 may include an interconnected framework of neurons that pass input data between various layers. Each layer of the CNN 122 may perform a different transformation on the output data from a preceding layer so that the final output of the CNN 122 results in a desired inference (such as a value of each digit displayed by the object of interest 101).

In the example of FIG. 1, the object of interest 101 is a persistent feature in each of the images 102 captured by computer vision system 100. As such, images 102 captured at different times may exhibit little or no change in pixel values (particularly images 102 that closer together in time). For example, pixels depicting the circular housing of the object of interest 101 are likely to remain unchanged across successive images 102. Even pixels depicting one or more digits of the display may remain unchanged across several images 102. For example, the least significant digit of the display (currently showing a "5") may change more frequently than any of the preceding digits (such as "0," "1," "2," "3," and "4"). Thus, the inferences 103 produced by the computer vision system 100 may be substantially similar (if not identical) for images 102 that are captured successively in time. More specifically, the intermediate layers of the CNN 122 are likely to produce many of the same activations in response to images 102 captured successively in time.

Aspects of the present disclosure recognize that higher computational loads in the CNN 122 result in greater power consumption by the computer vision system 100. In some aspects, the computer vision system 100 may reduce the computational load of the CNN 122, without loss of inferencing accuracy, by avoiding redundant computations in one or more layers of the CNN 122 that would otherwise produce the same (or substantially similar) activations for successive images 102. In some implementations, the CNN 122 may perform neural network operations (such as convolution, pooling, or pixel-wise operations) only on pixel values (and their derivatives) of an input image 102 that are substantially different than co-located pixel values of the preceding image 102. As used herein, the term "co-located" pixel values refers to pixel values that map to, or coincide with, the same relative location (such as the top-left corner) in different images or video frames.

Figure 2:
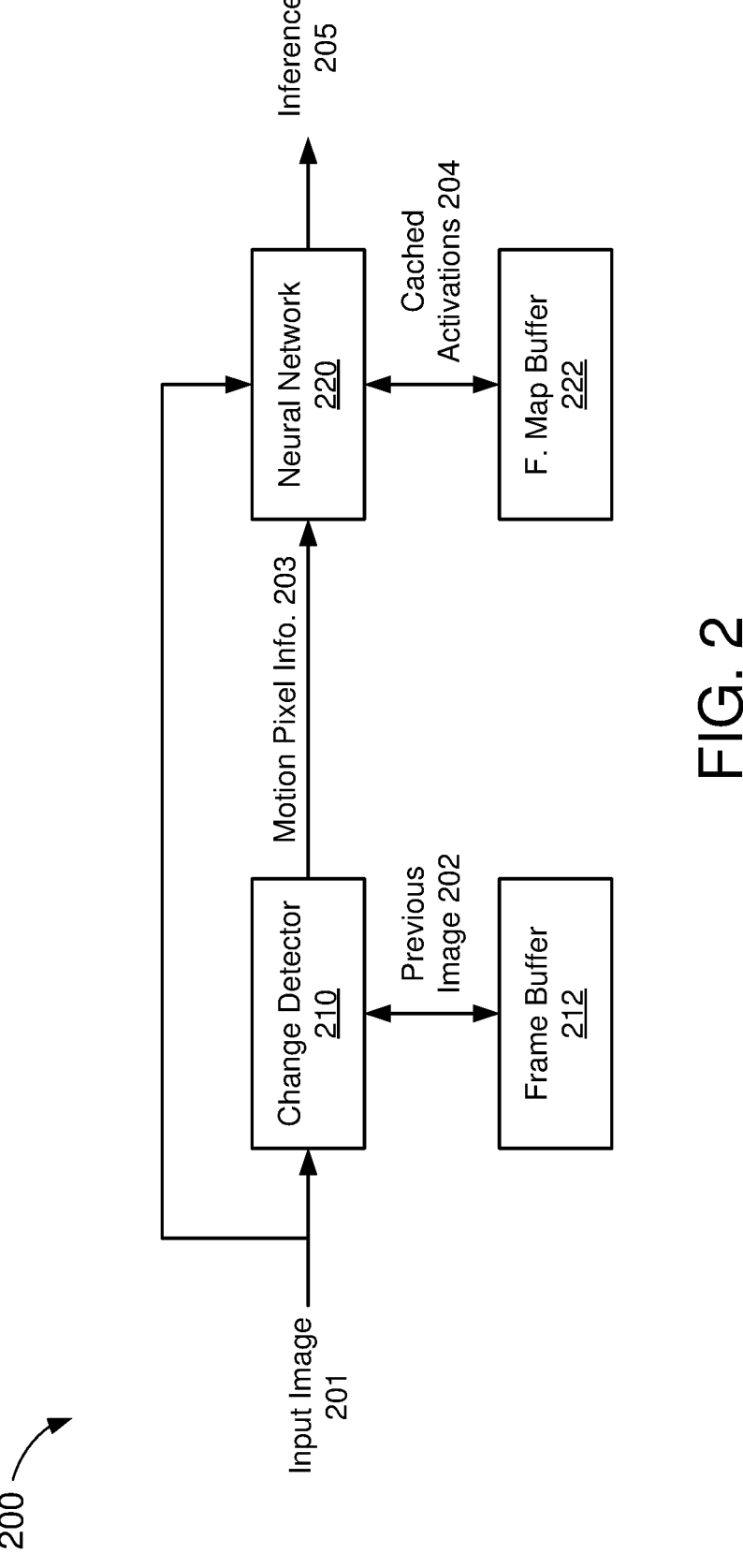
FIG. 2 shows a block diagram of an example machine learning system, according to some implementations.

FIG. 2 shows a block diagram of an example machine learning system 200, according to some implementations. In some implementations, the machine learning system 200 may be one example of the image analysis component 120 of FIG. 1. More specifically, the machine learning system 200 is configured to generate one or more inferences 205 based on an input image 201. With reference for example to FIG. 1, the input image 201 may be one example of any of the images 102 and each of the inferences 205 may be one example of any of the inferences 103. The machine learning system 200 includes a change detector 210, a frame buffer 212, a neural network 220, and a feature map buffer 222.

The change detector 210 is configured to detect changes or differences between the input image 201 and a previous image 202 received by the machine learning system 200 (prior to receiving the input image 201). In some implementations, the previous image 202 may precede the input image 201 in a sequence of images (or video frames) received from an image capture device (such as the image capture device 100 of FIG. 1) or other video source. Each of the images 201 and 202 may be represented by one or more arrays of pixel values associated with one or more color channels, respectively. More specifically, each pixel value in a given array may indicate a brightness or intensity of the associated color in a respective pixel of the input image 201 or the previous image 202. In some implementations, the previous image 202 may be stored in, and subsequently retrieved from, a frame buffer 212. After comparing the current input image 201 with the previous image 202 for changes or differences, the change detector 210 may store the input image 201 in the frame buffer 212 (to be compared with the next image in the sequence).

In some aspects, the change detector 210 may compare each pixel value of the input image 201 to a respective co-located pixel value of the previous image 202 to detect motion pixels (if any) associated with the input image 201. As used herein, the term "motion pixel" refers to any image pixel that undergoes a significant change in pixel value (often attributed to motion or movement of an object) between the previous image 202 and the input image 201. Aspects of the present disclosure recognize that various factors (such as sensor self-noise) may cause slight changes to one or more pixel values even if the scene remains unchanged. Thus, in some implementations, the change detector 210 may identify an image pixel as a motion pixel if its change in pixel value, between the previous image 202 and the input image 201, exceeds a threshold amount. In some other implementations, the change detector 210 may implement various image processing or computer vision techniques to classify the motion pixels. Any image pixel that is not classified as a motion pixel may be referred to herein as a "static pixel." In some implementations, the change detector 210 may provide motion pixel information 203 to the neural network 220 indicating which (if any) image pixels associated with the input image 201 are motion pixels.

The neural network 220 is configured to generate the inferences 205 based on the input image 201 and the motion pixel information 203. In some aspects, the neural network 220 may be a convolutional neural network (CNN) including one or more partially connected layers (such as convolutional layers and pooling layers, among other examples). Each layer of the neural network 220 includes one or more artificial neurons that perform neural network operations (such as convolutions, pooling, or pixel-wise operations) on the outputs produced by a previous layer of the neural network 220. For example, each neuron associated with a first (convolutional) layer of the neural network 220 may apply a convolutional filter to a respective subset of the pixel values associated with the input image 201. The convolutional filter is an N×N matrix having a predetermined set of filter weights. Each neuron calculates a dot product of the convolutional filter and an N×N subarray of pixel values located within its "receptive field" to produce a respective activation.

Each neuron has a receptive field that covers a different portion of the input image 201. The distance between the receptive fields is referred to as the "stride." For example, a stride of 1 indicates that each receptive field is offset by one column or row of pixel values from any adjacent receptive fields projected onto the input image 201. More specifically, each pixel value of the input image 201 falls within the receptive field of at least one of the neurons associated with the first layer of the neural network 220. Accordingly, each layer of the neural network 220 outputs a respective array of activations referred to as a "feature map." Each subsequent layer of the neural network 220 operates on the feature map output by a previous layer. For example, each neuron associated with a second (pooling) layer of the neural network 220 may output the average or maximum activation value associated with a respective M×M subarray of activations (output by the first layer of the neural network 220) located within its receptive field.

In some aspects, the neural network 220 may be configured to generate one or more feature maps based, at least in part, on one or more cached activations 204 associated with the previous image 202. For example, the neural network 220 may store or cache one or more of the feature maps generated as a result of processing the previous image 202. In some implementations, the cached activations 204 may be stored in a feature map buffer 222. As such, the neural network 220 may retrieve the one or more cached activations 204 from the feature map buffer 222 in lieu of computing one or more new activations, respectively, for a given feature map. In some implementations, the neural network 220 may substitute the cached activations 204 for activations that would otherwise be derived exclusively from static pixels associated with the input image 201. In other words, the neural network 220 may perform neural network operations only on pixel values of the input image 201 that are associated with motion pixels.

Figure 3A:
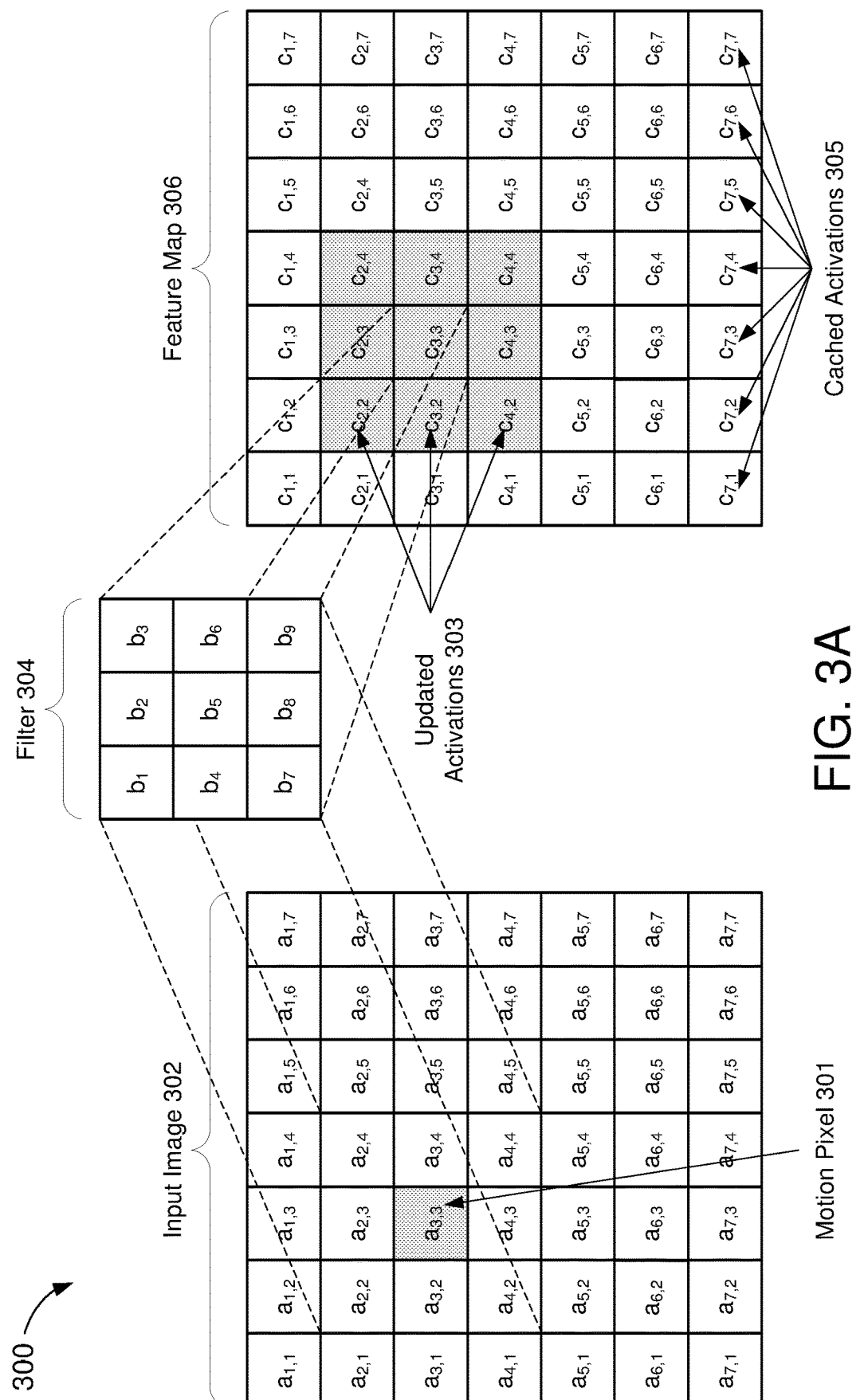
FIG. 3A shows an example neural network operation that can be performed using cached activations.

FIG. 3A shows an example neural network operation 300 that can be performed using cached activations. In some implementations, the example operation 300 may be performed by a neural network such as, for example, the neural network 220 of FIG. 2. More specifically, the neural network may generate a feature map 306 by applying a filter 304 to the pixel values of an input image 302. With reference for example to FIG. 2, the input image 302 may be one example of the input image 201. In some aspects, the filter 304 may be a convolutional filter associated with a convolutional layer of the neural network.

In the example of FIG. 3A, the input image 302 is depicted as a 7×7 array of pixel values $a_{1,1}$-$a_{7,7}$, the filter 304 is depicted as a 3×3 matrix having filter weights $b_1$-$b_9$, and the feature map 306 is depicted as a 7×7 array of activations $c_{1,1}$-$c_{7,7}$. However, in actual implementations, the input image 302, the filter 304, and the feature map 306 may have any suitable dimensions. The feature map 306 may be generated by applying the filter 304 to one or more 3×3 subarrays of pixel values in the input image 302 with a stride of 1 and same padding (which adds zero values to the border of the input image 302 to participate in the convolutions). For example, as shown in FIG. 3A, the neural network may apply the filter 304 to the subarray of pixel values $a_{2,2}$, $a_{2,3}$, $a_{2,4}$, $a_{3,2}$, $a_{3,3}$, $a_{3,4}$, $a_{4,2}$, $a_{4,3}$, and $a_{4,4}$ to produce the activation $c_{3,3}$ (where $c_{3,3}=b_1 \cdot a_{2,2}+b_2 \cdot a_{2,3}+b_3 \cdot a_{2,4}+b_4 \cdot a_{3,2}+b_5 \cdot a_{3,3}+b_6 \cdot a_{3,4}+b_7 \cdot a_{4,2}+b_8 \cdot a_{4,3}+b_9 \cdot a_{4,4}$). Thus, the pixel values $a_{2,2}$, $a_{2,3}$, $a_{2,4}$, $a_{3,2}$, $a_{3,3}$, $a_{3,4}$, $a_{4,2}$, $a_{4,3}$, and $a_{4,4}$ fall within the receptive field of an artificial neuron that produces the activation $c_{3,3}$.

In some aspects, the neural network may selectively apply the filter 304 to a subset of pixel values of the input image 302 based on motion pixel information associated with the input image 302 (such as the motion pixel information 203 of FIG. 2). As described with reference to FIG. 2, the motion pixel information may indicate which of the pixel values $a_{1,1}$-$a_{7,7}$ is associated with a motion pixel. In some implementations, the neural network may apply the filter 304 only to individual subarrays of pixel values associated with one or more motion pixels. In the example of FIG. 3A, only the pixel value $a_{3,3}$ is associated with a motion pixel 301. However, the pixel value $a_{3,3}$ is included in 9 different 3×3 subarrays of pixel values of the input image 302 (which include the pixel values $a_{1,1}$-$a_{1,5}$, $a_{2,1}$-$a_{2,5}$, $a_{3,1}$-$a_{3,5}$, $a_{4,1}$-$a_{4,5}$, and $a_{5,1}$-$a_{5,5}$). Thus, in some implementations, the neural network may apply the filter 304 only to the 9 subarrays of pixel values that include the pixel value $a_{3,3}$.

For example, the neural network may apply the filter 304 to the pixel values $a_{1,1}$, $a_{1,2}$, $a_{1,3}$, $a_{2,1}$, $a_{2,2}$, $a_{2,3}$, $a_{3,1}$, $a_{3,2}$, and $a_{3,3}$ to produce the activation $c_{2,2}$; the neural network may apply the filter 304 to the pixel values $a_{1,2}$, $a_{1,3}$, $a_{1,4}$, $a_{2,2}$, $a_{2,3}$, $a_{2,4}$, $a_{3,2}$, $a_{3,3}$, and $a_{3,4}$ to produce the activation $c_{2,3}$; the neural network may apply the filter 304 to the pixel values $a_{1,3}$, $a_{1,4}$, $a_{1,5}$, $a_{2,3}$, $a_{2,4}$, $a_{2,5}$, $a_{3,3}$, $a_{3,4}$, and $a_{3,5}$ to produce the activation $c_{2,4}$; the neural network may apply the filter 304 to the pixel values $a_{2,1}$, $a_{2,2}$, $a_{2,3}$, $a_{3,1}$, $a_{3,2}$, $a_{3,3}$, $a_{4,1}$, $a_{4,2}$, and $a_{4,3}$ to produce the activation $c_{3,2}$; the neural network may apply the filter 304 to the pixel values $a_{2,2}$, $a_{2,3}$, $a_{2,4}$, $a_{3,2}$, $a_{3,3}$, $a_{3,4}$, $a_{4,2}$, $a_{4,3}$, and $a_{4,4}$ to produce the activation $c_{3,3}$; the neural network may apply the filter 304 to the pixel values $a_{2,3}$, $a_{2,4}$, $a_{2,5}$, $a_{3,3}$, $a_{3,4}$, $a_{3,5}$, $a_{4,3}$, $a_{4,4}$, and $a_{4,5}$ to produce the activation $c_{3,4}$; the neural network may apply the filter 304 to the pixel values $a_{3,1}$, $a_{3,2}$, $a_{3,3}$, $a_{4,1}$, $a_{4,2}$, $a_{4,3}$, $a_{5,1}$, $a_{5,2}$, and $a_{5,3}$ to produce the activation $c_{4,2}$; the neural network may apply the filter 304 to the pixel values $a_{3,2}$, $a_{3,3}$, $a_{3,4}$, $a_{4,2}$, $a_{4,3}$, $a_{4,4}$, $a_{5,2}$, $a_{5,3}$, and $a_{5,4}$ to produce the activation $c_{4,3}$; and the neural network may apply the filter 304 to the pixel values $a_{3,3}$, $a_{3,4}$, $a_{3,5}$, $a_{4,3}$, $a_{4,4}$, $a_{4,5}$, $a_{5,3}$, $a_{5,4}$, and $a_{5,5}$ to produce the activation $c_{4,4}$.

As shown in FIG. 3A, the neural network only calculates the activations $c_{2,2}$, $c_{2,3}$, $c_{2,4}$, $c_{3,2}$, $c_{3,3}$, $c_{3,4}$, $c_{4,2}$, $c_{4,3}$, and $c_{4,4}$, as updated activations 303, for the feature map 306. The remaining activations of the feature map 306 are retrieved from memory (such as the frame map buffer 222 of FIG. 2), as cached activations 305. As described with reference to FIG. 2, the cached activations 305 may be previously calculated by the neural network based on one or more images that precede the input image 302 in a sequence of images. In some aspects, the neural network may further store the feature map 306 as a set of cached activations that can be used to generate future feature maps associated with the convolutional layer of the neural network (such as when processing one or more subsequent images in the sequence of images).

Figure 3B:
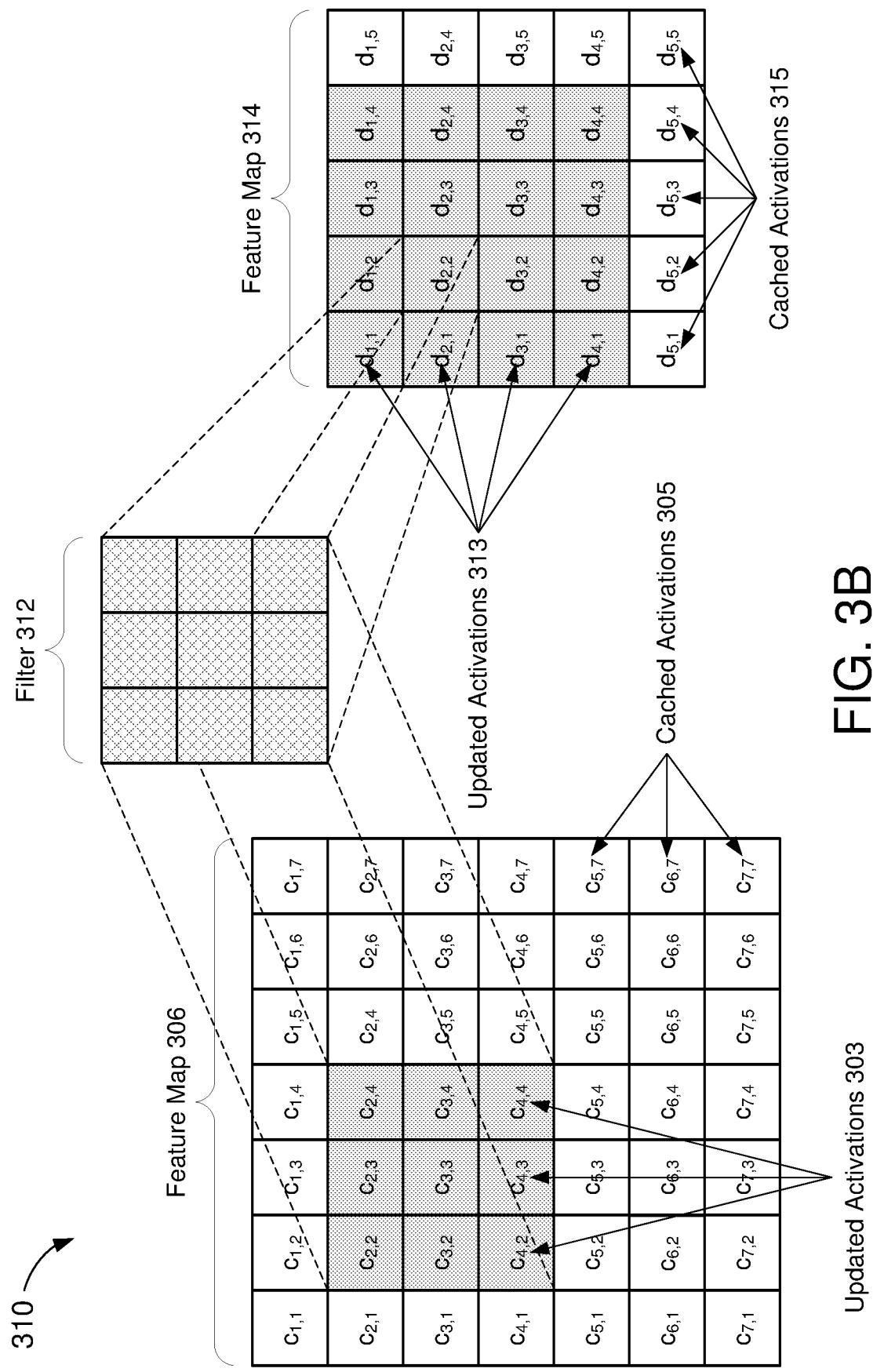
FIG. 3B shows another example neural network operation that can be performed using cached activations.

FIG. 3B shows another example neural network operation 310 that can be performed using cached activations. In some implementations, the example operation 310 may be performed by a neural network such as, for example, the neural network 220 of FIG. 2. More specifically, the neural network may generate another feature map 314 by applying a filter 312 to the activations of the feature map 306. For example, the feature map 314 may be associated with a deeper layer of the neural network than the feature map 306. In some aspects, the filter 312 may be a pooling filter associated with a pooling layer of the neural network.

In the example of FIG. 3B, the filter 312 is depicted as a 3×3 pooling matrix and feature map 314 is depicted as a 5×5 array of activations $d_{1,1}$-$d_{5,5}$. However, in actual implementations, the filter 312 and the feature map 314 may have any suitable dimensions. The feature map 314 may be generated by applying the filter 312 to one or more 3×3 subarrays of activations in the feature map 306 with a stride of 1 and valid padding (or no padding). For example, as shown in FIG. 3B, the neural network may apply the filter 312 to the subarray of activations $c_{2,2}$, $c_{2,3}$, $c_{2,4}$, $c_{3,2}$, $c_{3,3}$, $c_{3,4}$, $c_{4,2}$, $c_{4,3}$, and $c_{4,4}$ to produce the activation $d_{2,2}$. Thus, the pixel values $c_{2,2}$, $c_{2,3}$, $c_{2,4}$, $c_{3,2}$, $c_{3,3}$, $c_{3,4}$, $c_{4,2}$, $c_{4,3}$, and $c_{4,4}$ fall within the receptive field of an artificial neuron that produces the activation $d_{2,2}$. In some implementations, the filter 312 may be configured to perform a max pooling operation (where $d_{2,2}$=max($c_{2,2}$, $c_{2,3}$, $c_{2,4}$, $c_{3,2}$, $c_{3,3}$, $c_{3,4}$, $c_{4,2}$, $c_{4,3}$, $c_{4,4}$)). In some other implementations, the filter 312 may be configured to perform an average pooling operation (where $d_{2,2}$= ($c_{2,2}$+$c_{2,3}$+$c_{2,4}$+$c_{3,2}$+$c_{3,3}$+$c_{3,4}$+$c_{4,2}$+$c_{4,3}$+$c_{4,4}$)/9).

In some aspects, the neural network may selectively apply the filter 312 to a subset of activations of the feature map 306 based, at least in part, on the motion pixel information associated with the input image 302. More specifically, the neural network may apply the filter 312 only to subarrays of activations that are derived, at least in part, from one or more motion pixels. As described with reference to FIG. 3A, only the pixel value $a_{3,3}$ is associated with a motion pixel 301, and only the updated activations 303 are computed based on the pixel value $a_{3,3}$. However, the updated activations 303 are included in 16 different 3×3 subarrays of activations of the feature map 306 (which include the activations $c_{1,1}$-$c_{1,6}$, $c_{2,1}$-$c_{2,6}$, $c_{3,1}$-$c_{3,6}$, $c_{4,1}$-$c_{4,6}$, $c_{5,1}$-$c_{5,6}$, and $c_{6,1}$-$c_{6,6}$). Thus, in some implementations, the neural network may apply the filter 312 only to the 16 subarrays of pixel values that include at least one of the updated activations 303.

For example, the neural network may apply the filter 312 to the activations $c_{1,1}$, $c_{1,2}$, $c_{1,3}$, $c_{2,1}$, $c_{2,2}$, $c_{2,3}$, $c_{3,1}$, $c_{3,2}$, and $c_{3,3}$ to produce the activation $d_{1,1}$; the neural network may apply the filter 312 to activations $c_{1,2}$, $c_{1,3}$, $c_{1,4}$, $c_{2,2}$, $c_{2,3}$, $c_{2,4}$, $c_{3,2}$, $c_{3,3}$, and $c_{3,4}$ to produce the activation $d_{1,2}$; the neural network may apply the filter 312 to the activations $c_{1,3}$, $c_{1,4}$, $c_{1,5}$, $c_{2,3}$, $c_{2,4}$, $c_{2,5}$, $c_{3,3}$, $c_{3,4}$, and $c_{3,5}$ to produce the activation $d_{1,3}$; the neural network may apply the filter 312 to the activations $c_{1,4}$, $c_{1,5}$, $c_{1,6}$, $c_{2,4}$, $c_{2,5}$, $c_{2,6}$, $c_{3,4}$, $c_{3,5}$, and $c_{3,6}$ to produce the activation $d_{1,4}$; the neural network may apply the filter 312 to the activations $c_{2,1}$, $c_{2,2}$, $c_{2,3}$, $c_{3,1}$, $c_{3,2}$, $c_{3,3}$, $c_{4,1}$, $c_{4,2}$, and $c_{4,3}$ to produce the activation $d_{2,1}$; the neural network may apply the filter 312 to the activations $c_{2,2}$, $c_{2,3}$, $c_{2,4}$, $c_{3,2}$, $c_{3,3}$, $c_{3,4}$, $c_{4,2}$, $c_{4,3}$, and $c_{4,4}$ to produce the activation $d_{2,2}$; the neural network may apply the filter 312 to the activations $c_{2,3}$, $c_{2,4}$, $c_{2,5}$, $c_{3,3}$, $c_{3,4}$, $c_{3,5}$, $c_{4,3}$, $c_{4,4}$, and $c_{4,5}$ to produce the activation $d_{2,3}$; and the neural network may apply the filter 312 to the activations $c_{2,4}$, $c_{2,5}$, $c_{2,6}$, $c_{3,4}$, $c_{3,5}$, $c_{3,6}$, $c_{4,4}$, $c_{4,5}$, and $c_{4,6}$ to produce the activation $d_{2,4}$.

Further, the neural network may apply the filter 312 to the activations $c_{3,1}$, $c_{3,2}$, $c_{3,3}$, $c_{4,1}$, $c_{4,2}$, $c_{4,3}$, $c_{5,1}$, $c_{5,2}$ and $c_{5,3}$ to produce the activation $d_{3,1}$; the neural network may apply the filter 312 to the activations $c_{3,2}$, $c_{3,3}$, $c_{3,4}$, $c_{4,2}$, $c_{4,3}$, $c_{4,4}$, $c_{5,2}$, $c_{5,3}$, and $c_{5,4}$ to produce the activation $d_{3,2}$; the neural network may apply the filter 312 to the activations $c_{3,3}$, $c_{3,4}$, $c_{3,5}$, $c_{4,3}$, $c_{4,4}$, $c_{4,5}$, $c_{5,3}$, $c_{5,4}$, and $c_{5,5}$ to produce the activation $d_{3,3}$; the neural network may apply the filter 312 to the activations $c_{3,4}$, $c_{3,5}$, $c_{3,6}$, $c_{4,4}$, $c_{4,5}$, $c_{4,6}$, $c_{5,4}$, $c_{5,5}$, and $c_{5,6}$ to produce the activation $d_{3,4}$; the neural network may apply the filter 312 to the activations $c_{4,1}$, $c_{4,2}$, $c_{4,3}$, $c_{5,1}$, $c_{5,2}$, $c_{5,3}$, $c_{6,1}$, $c_{6,2}$, and $c_{6,3}$ to produce the activation $d_{4,1}$; the neural network may apply the filter 312 to the activations $c_{4,2}$, $c_{4,3}$, $c_{4,4}$, $c_{5,2}$, $c_{5,3}$, $c_{5,4}$, $c_{6,2}$, $c_{6,3}$, and $c_{6,4}$ to produce the activation $d_{4,2}$; the neural network may apply the filter 312 to the activations $c_{4,3}$, $c_{4,4}$, $c_{4,5}$, $c_{5,3}$, $c_{5,4}$, $c_{5,5}$, $c_{6,3}$, $c_{6,4}$, and $c_{6,5}$ to produce the activation $d_{4,3}$; and the neural network may apply the filter 312 to the activations $c_{4,4}$, $c_{4,5}$, $c_{4,6}$, $c_{5,4}$, $c_{5,5}$, $c_{5,6}$, $c_{6,4}$, $c_{6,5}$, and $c_{6,6}$ to produce the activation $d_{4,4}$.

As shown in FIG. 3B, the neural network only calculates the activations $d_{1,1}$, $d_{1,2}$, $d_{1,3}$, $d_{1,4}$, $d_{2,1}$, $d_{2,2}$, $d_{2,3}$, $d_{2,4}$, $d_{3,1}$, $d_{3,2}$, $d_{3,3}$, $d_{3,4}$, $d_{4,1}$, $d_{4,2}$, $d_{4,3}$, and $d_{4,4}$, as updated activations 313, for the feature map 314. The remaining activations of the feature map 314 are retrieved from memory (such as the frame map buffer 222 of FIG. 2), as cached activations 315. As described with reference to FIG. 2, the cached activations 315 may be previously calculated by the neural network based on one or more images that precede the input image 302 in a sequence of images. In some aspects, the neural network may further store the feature map 314 as a set of cached activations that can be used to generate future feature maps associated with the pooling layer of the neural network (such as when processing one or more subsequent images in the sequence of images).

Figure 4:
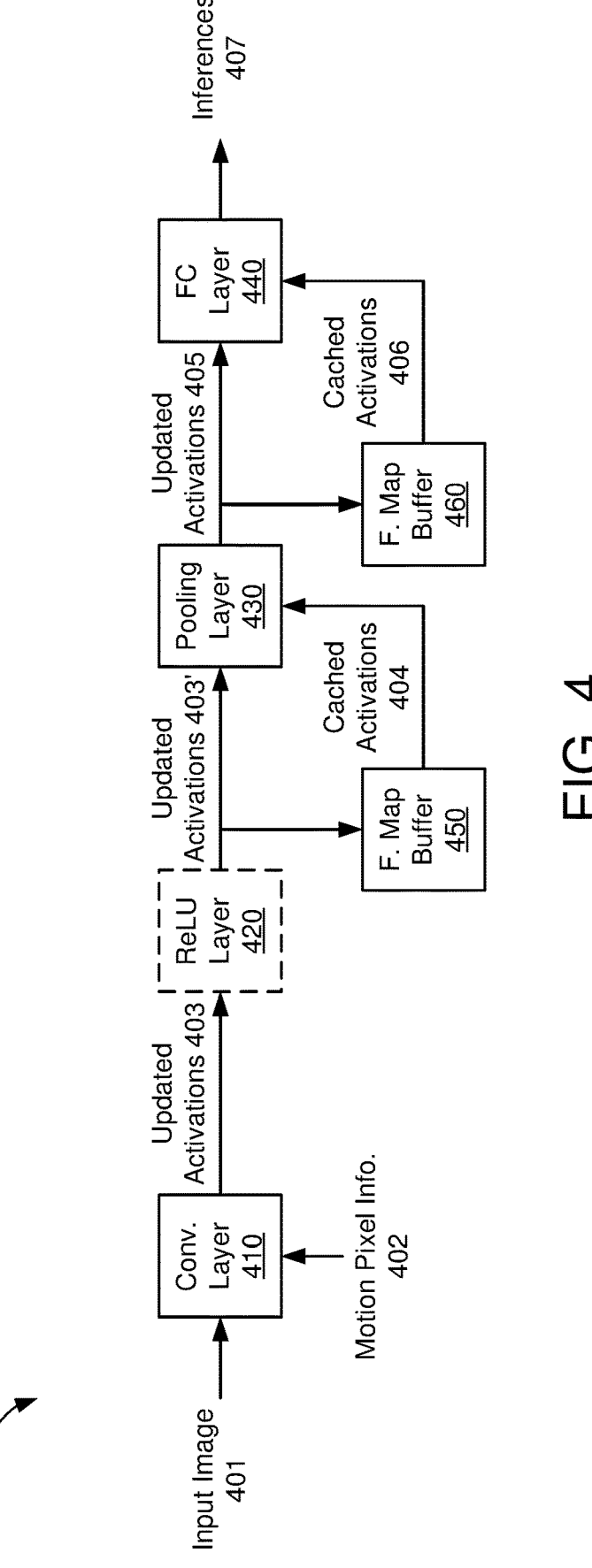
FIG. 4 shows a block diagram of an example neural network, according to some implementations.

FIG. 4 shows a block diagram of an example neural network 400, according to some implementations. In some implementations, the neural network 400 may be one example of the neural network 220 of FIG. 2. More specifically, the neural network 400 is configured to generate inferences 407 based on an input image 401 and motion pixel information 402. With reference for example to FIG. 2, the input image 401 may be one example of the input image 201 and the motion pixel information 402 may be one example of the motion pixel information 203.

The neural network 400 is shown to include a convolutional layer 410, a pooling layer 430, and a fully-connected (FC) layer 440. However, in actual implementations, the neural network 400 may include fewer or more layers than what is depicted in FIG. 4. In some implementations, the neural network 400 may include fewer or more convolutional layers than the convolutional layer 410. In some other implementations, the neural network 400 may include fewer or more pooling layers than the pooling layer 430. Still further, in some implementations, the neural network 400 may include one or more additional FC layers (not shown for simplicity).

The convolutional layer 410 is configured to perform a convolution operation on the input image 402. In some implementations, the convolution operation may be one example of the neural network operation 300 of FIG. 3A. More specifically, the convolutional layer 410 may selectively apply a convolutional filter (such as the filter 304 of FIG. 3A) to the input image 401, based on the motion pixel information 402, to produce a set of updated activations 403. For example, the motion pixel information 402 may indicate which (if any) pixel values of the input image 401 are associated with motion pixels. In some aspects, the convolutional layer 410 may apply the convolutional filter only to subarrays of pixel values that are associated with motion pixels (such as described with reference to FIG. 3A). Thus, the updated activations 403 may be one example of the updated activations 303 of FIG. 3A. In some implementations, the convolutional layer 410 may perform multiple convolution operations (using different convolutional filters) on the input image 402.

In some implementations, the neural network 400 may further include a rectified linear unit (ReLU) layer 420 that applies a non-linear transformation to the updated activations 403. For example, as a result of the convolutions performed by the convolutional layer 410, the updated activations 403 may include one or more negative values. The ReLU layer 420 is configured to produce a non-negative set of updated activations 403' by replacing any negative values among the updated activations 403 with a value equal to zero. As a result of the non-linear transformation, each of the updated activations 403' is greater than or equal to zero.

In some aspects, the updated activations 403' (or the updated activations 403) may be cached or stored in a first feature map buffer 450. More specifically, the first feature map buffer 450 may be configured to store a set of cached activations representing a feature map previously calculated by the convolutional layer 410. In some implementations, the first feature map buffer 450 may update the feature map stored therein by replacing one or more of the cached activations with the updated activations 403' (or the updated activations 403). As such, the updated activations 403' or 403 may be combined with the remaining cached activations 404 stored in the first feature map buffer 450 to produce a feature map associated with the convolutional layer 410 for the current input image 401 (such as the feature map 306 of FIG. 3A).

The pooling layer 430 is configured to perform a pooling operation on the feature map associated with the convolutional layer 410 (which includes the updated activations 403' or 403 and the cached activations 404). In some implementations, the pooling operation may be one example of the neural network operation 310 of FIG. 3B. More specifically, the pooling layer 430 may selectively apply a pooling filter (such as the filter 312 of FIG. 3B) to the feature map, based on the updated activations 403' or 403, to produce a set of updated activations 405. In some aspects, the pooling layer 430 may apply the pooling filter only to subarrays of activations that include at least one of the updated activations 403' or 403 (such as described with reference to FIG. 3B). Thus, the updated activations 405 may be one example of the updated activations 313 of FIG. 3B. In some implementations, the pooling layer 430 may perform multiple pooling operations (using different pooling filters) on the feature map associated with the convolutional layer 410.

In some aspects, the updated activations 405 may be cached or stored in a second feature map buffer 460. More specifically, the second feature map buffer 460 may be configured to store a set of cached activations representing a feature map previously calculated by the pooling layer 430. In some implementations, the second feature map buffer 450 may update the feature map stored therein by replacing one or more of the cached activations with the updated activations 405. As such, the updated activations 450 may be combined with the remaining cached activations 406 stored in the second feature map buffer 460 to produce a feature map associated with the pooling layer 430 for the current input image 401 (such as the feature map 314 of FIG. 3B).

The FC layer 440 is configured to generate the inferences 407 based on the feature map associated with the pooling layer 430 (which includes the updated activations 405 and the cached activations 406). More specifically, the FC layer 440 may classify one or more features of the input image 401 extracted by the convolutional layer 410 and the pooling layer 430. For example, the FC layer 440 may perform the classification operation using a softmax activation function. In some implementations, the inferences 407 may include one or more of the classifications determined by the FC layer 440. With reference for example to FIG. 1, the inferences 407 may include an indication that the input image 401 includes the object of interest 101 and an interpretation of the numerical values ("012345") displayed on the object of interest 101.

As described with reference to FIGS. 1 and 2, caching activations may reduce the computational load (and power consumption) of the neural network 400. However, the reduction in computational load comes at a cost of increased memory usage. In some aspects, the neural network 400 may balance the processing power needed to perform various neural network operations with the memory resources needed to store or cache various activations. In some implementations, the neural network 400 may cache the feature maps associated with some, but not all, of the partially connected layers (such as the convolutional layer 410 or the pooling layer 430). In some other implementations, the neural network 400 may cache some, but not all, of the activations associated with any of the feature maps.

As shown in FIG. 3B, many of the cached activations 305 of the feature map 306 (such as the activations $c_{7,1}$-$c_{7,7}$, $c_{1,7}$, $c_{2,7}$, $c_{3,7}$, $c_{4,7}$, $c_{5,7}$, and $c_{6,7}$) do not participate in the neural network operation 310. Aspects of the present disclosure recognize that the neural network can reduce memory usage by discarding (or not caching) any activations that do not participate in a subsequent neural network operation. For example, the neural network may cache only the activations $c_{1,1}$-$c_{1,6}$ (and discard the remaining activations $c_{7,1}$-$c_{7,7}$, $c_{1,7}$, $c_{2,7}$, $c_{3,7}$, $c_{4,7}$, $c_{5,7}$, and $c_{6,7}$) as a result of processing a previous image.

In some aspects, a motion prediction component (not shown for simplicity) may be used to predict the changes in pixel values, in the future images, so that the neural network can determine which activations to cache and which activations to discard. For example, the changes in pixel values can be predicted based on an assumption that objects depicted in each image must obey the physical laws of motion. In some implementations, the motion prediction component may predict movement of one or more objects in an image based on another (smaller) neural network model or algorithm (such as a Newtonian motion equation).

In some implementations, the neural network 400 may selectively cache (or discard) individual activations based on various hyperparameters associated with each layer of the neural network 400 (such as filter size, stride, and padding type) and existing motion prediction techniques. With reference for example to FIG. 1, the neural network 400 may predict that the least significant digit displayed by the object of interest 101 (currently showing a "5") changes 9 times before the next digit of the display (currently showing a "4") changes once. Accordingly, the neural network 400 may predict which pixel values of an input image are associated with motion pixels, for example, based on the timing of the input image or the inferences generated from a previous image.

Figure 5:
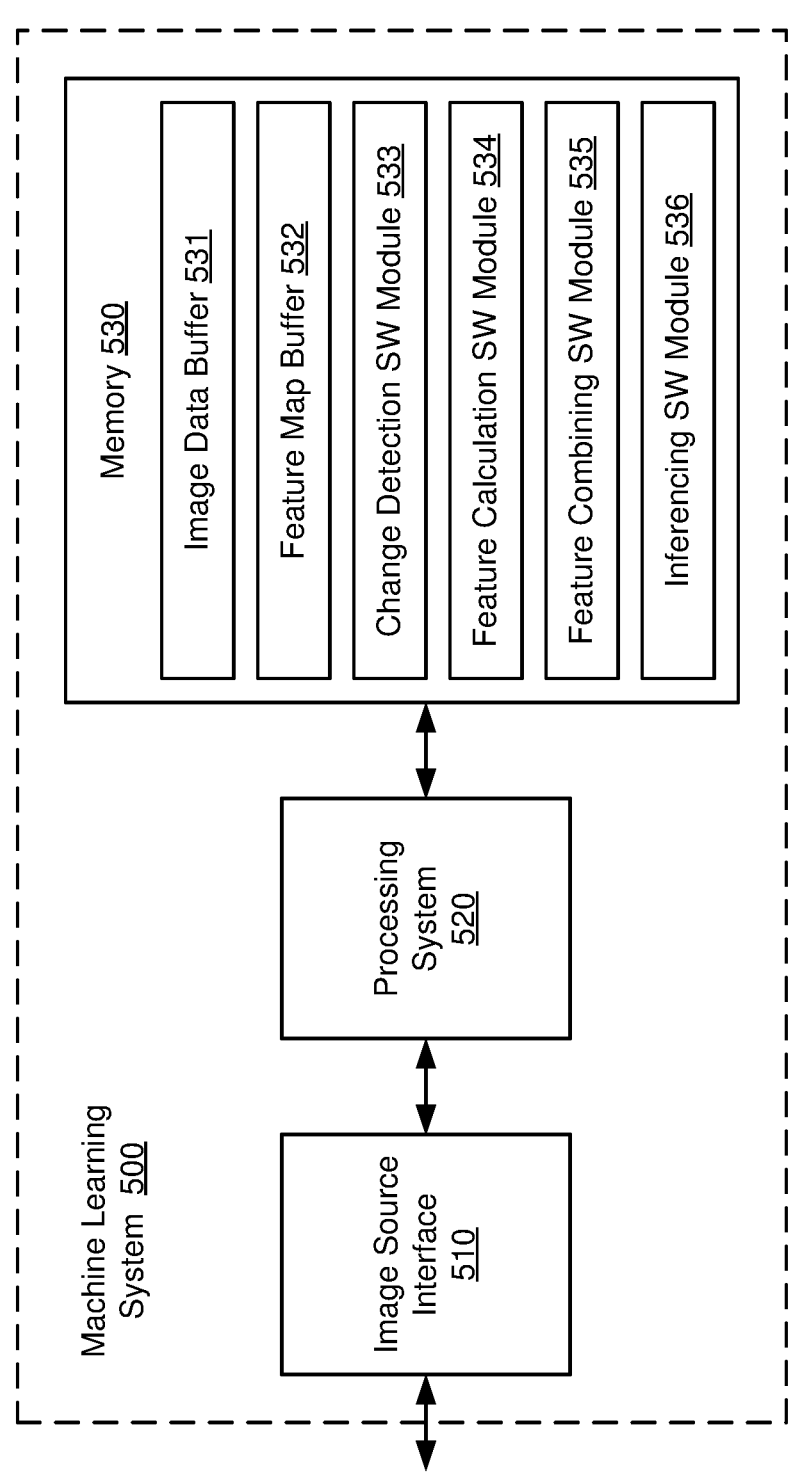
FIG. 5 shows another block diagram of an example machine learning system, according to some implementations.

FIG. 5 shows another block diagram of an example machine learning system 500, according to some implementation. In some implementations, the machine learning system 500 may be one example of the image analysis component 120 of FIG. 1 or the machine learning system 200 of FIG. 2. More specifically, the machine learning system 500 may be configured to generate inferences based on a sequence of images (or video frames).

The machine learning system 500 includes an image source interface 510, a processing system 520, and a memory 530. The image source interface 510 is configured to receive image data from an image source (such as the image capture component 110 of FIG. 1). In some implementations, the image source interface 510 may receive an array of first pixel values representing an image n in the sequence of images.

The memory 530 may include an image data store 531 to store the received image data and a feature map buffer 532 to store one or more feature maps produced by the machine learning system 500 as a result of generating the inferences.

The memory 530 also may include a non-transitory computer-readable medium (including one or more nonvolatile memory elements, such as EPROM, EEPROM, Flash memory, a hard drive, and the like) that may store at least the following software (SW) modules:

a change detection SW module 533 to detect differences between the array of first pixel values and an array of second pixel values representing an image n–1 that precedes the image n in the sequence of images;

a feature calculation SW module 534 to apply a first filter associated with a first layer of a CNN to one or more subarrays of the array of first pixel values based on the differences detected between the array of first pixel values and the array of second pixel values, where the application of the first filter to the one or more subarrays of the array of first pixel values produces one or more newly computed first activations, respectively;

a feature combining SW module 535 to generate an array of first activations associated with the first layer of the CNN based on the one or more newly computed first activations and one or more cached first activations associated with the image n–1; and an inferencing SW module 536 to determine one or more inferences about the image n based at least in part on the array of first activations.

Each software module includes instructions that, when executed by the processing system 520, causes the machine learning system 500 to perform the corresponding functions.

The processing system 520 may include any suitable one or more processors capable of executing scripts or instructions of one or more software programs stored in the machine learning system 500 (such as in memory 530). For example, the processing system 520 may execute the change detection SW module 533 to detect differences between the array of first pixel values and an array of second pixel values representing an image n–1 that precedes the image n in the sequence of images. The processing system 520 may further execute the feature calculation SW module 534 to apply a first filter associated with a first layer of a CNN to one or more subarrays of the array of first pixel values based on the differences detected between the array of first pixel values and the array of second pixel values, where the application of the first filter to the one or more subarrays of the array of first pixel values produces one or more newly computed first activations, respectively. The processing system 520 also may execute the feature combining SW module 535 to generate an array of first activations associated with the first layer of the CNN based on the one or more newly computed first activations and one or more cached first activations associated with the image n–1. Still further, the processing system 520 may execute the inferencing SW module 536 to determine one or more inferences about the image n based at least in part on the array of first activations.

FIG. 6 shows an illustrative flowchart depicting an example inferencing operation 600, according to some implementations. In some implementations, the example operation 600 may be performed by a machine learning system (such as the image analysis component 120 of FIG. 1 or the machine learning system 200 of FIG. 2) to generate inferences about a sequence of images (or video frames).

The machine learning system receives an array of first pixel values representing an image n in a sequence of images (610). The machine learning system detects differences between the array of first pixel values and an array of second pixel values representing an image n–1 that precedes the image n in the sequence of images (620). The machine learning system applies a first filter associated with a first layer of a CNN to one or more subarrays of the array of first pixel values based on the differences detected between the array of first pixel values and the array of second pixel values, where the application of the first filter to the one or more subarrays of the array of first pixel values produces one or more newly computed first activations, respectively (630). In some implementations, the first layer of the CNN may be a convolutional layer. In some other implementations, the first layer of the CNN may be a pooling layer.

In some aspects, the machine learning system may select the one or more subarrays of the array of first pixel values based at least in part on dimensions of a receptive field associated with the first filter, where each subarray of the one or more subarrays spans the dimensions of the receptive field. In some implementations, the selecting of the one or more subarrays of the array of first pixel values may include determining that the differences detected between one or more first pixel values in the array of first pixel values and one or more second pixel values in the array of second pixel values exceed a threshold amount, where each of the one or more subarrays includes at least one of the one or more first pixel values.

The machine learning system further generates an array of first activations associated with the first layer of the CNN based on the one or more newly computed first activations and one or more cached first activations associated with the image n−1 (640). In some implementations, the generating of the array of first feature values may include applying an activation function to the one or more newly computed first activations. The machine learning system also determines one or more inferences about the image n based at least in part on the array of first activations (650).

In some aspects, the machine learning system may apply a second filter associated with a second layer of the CNN to one or more subarrays of the array of first activations based at least in part on the one or more newly computed first activations, where the application of the second filter to the one or more subarrays of the array of first activations produces one or more newly computed second activations, respectively; and generate an array of second activations associated with the second layer of the CNN based on the one or more newly computed second activations and one or more cached second activations associated with the image n−1. In some implementations, each of the one or more subarrays of the array of first activations may include at least one of the one or more newly computed first activations.

In some aspects, the machine learning system may further receive an array of third pixel values representing an image n+1 that follows the image n in the sequence of images; detect differences between the array of third pixel values and the array of first pixel values; apply the first filter to one or more subarrays of the array of third pixel values based on the differences detected between the array of third pixel values and the array of first pixel values, where the application of the first filter to the one or more subarrays of the array of third pixel values produces one or more newly computed second activations, respectively; and generate an array of second activations associated with the first layer of the CNN based on the one or more newly computed second activations and one or more first activations from the array of first activations. In some implementations, the one or more first activations may include at least one of the one or more cached first activations associated with the image n−1.

In some aspects, the machine learning system may further detect one or more motion pixels in the first image; predict movement associated with the one or more motion pixels; and selectively discard one or more first activations of the array of first activations based on the predicted movement associated with the one or more motion pixels.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of inferencing, comprising:

receiving an array of first pixel values representing an image n in a sequence of images;

detecting differences between the array of first pixel values and an array of second pixel values representing an image n−1 that precedes the image n in the sequence of images;

applying a first filter associated with a first layer of a convolutional neural network (CNN) to one or more subarrays of the array of first pixel values based on the differences detected between the array of first pixel values and the array of second pixel values, the application of the first filter to the one or more subarrays of the array of first pixel values producing one or more newly computed first activations, respectively;

generating an array of first activations associated with the first layer of the CNN based on the one or more newly computed first activations and one or more cached first activations associated with the image n−1;

detecting one or more motion pixels in the first image;

predicting movement associated with the one or more motion pixels;

selectively discarding one or more first activations of the array of first activations based on the predicted movement associated with the one or more motion pixels; and determining one or more inferences about the image n based at least in part on the array of first activations.

2. The method of claim 1, further comprising:

selecting the one or more subarrays of the array of first pixel values based at least in part on dimensions of a receptive field associated with the first filter, each subarray of the one or more subarrays spanning the dimensions of the receptive field.

3. The method of claim 2, wherein the selecting of the one of more subarrays of the array of first pixel values comprises:

determining that the differences detected between one or more first pixel values in the array of first pixel values and one or more second pixel values in the array of second pixel values exceed a threshold amount, each of the one or more subarrays including at least one of the one or more first pixel values.

4. The method of claim 1, wherein the generating of the array of first activations comprises:

applying an activation function to the one or more newly computed first activations.

5. The method of claim 1, further comprising:

applying a second filter associated with a second layer of the CNN to one or more subarrays of the array of first activations based at least in part on the one or more newly computed first activations, the application of the second filter to the one or more subarrays of the array of first activations producing one or more newly computed second activations, respectively; and generating an array of second activations associated with the second layer of the CNN based on the one or more newly computed second activations and one or more cached second activations associated with the image n−1.

6. The method of claim 5, wherein each of the one or more subarrays of the array of first activations includes at least one of the one or more newly computed first activations.

7. The method of claim 1, further comprising:

receiving an array of third pixel values representing an image n+1 that follows the image n in the sequence of images;

detecting differences between the array of third pixel values and the array of first pixel values;

applying the first filter to one or more subarrays of the array of third pixel values based on the differences detected between the array of third pixel values and the array of first pixel values, the application of the first filter to the one or more subarrays of the array of third pixel values producing one or more newly computed second activations, respectively; and generating an array of second activations associated with the first layer of the CNN based on the one or more newly computed second activations and one or more first activations from the array of first activations.

8. The method of claim 7, wherein the one or more first activations include at least one of the one or more cached first activations associated with the image n−1.

9. The method of claim 1, wherein the first layer of the CNN is a convolutional layer.

10. The method of claim 1, wherein the first layer of the CNN is a pooling layer.

11. A machine learning system comprising:

a processing system; and a memory storing instructions that, when executed by the processing system, causes the machine learning system to:

receive an array of first pixel values representing an image n in a sequence of images;

detect differences between the array of first pixel values and an array of second pixel values representing an image n−1 that precedes the image n in the sequence of images;

apply a first filter associated with a first layer of a convolutional neural network (CNN) to one or more subarrays of the array of first pixel values based on the differences detected between the array of first pixel values and the array of second pixel values, the application of the first filter to the one or more subarrays of the array of first pixel values producing one or more newly computed first activations, respectively;

generate an array of first activations associated with the first layer of the CNN based on the one or more newly computed first activations and one or more cached first activations associated with the image n−1;

detect one or more motion pixels in the first image;

predict movement associated with the one or more motion pixels;

selectively discard one or more first activations of the array of first activations based on the predicted movement associated with the one or more motion pixels; and determine one or more inferences about the image n based at least in part on the array of first activations.

12. The machine learning system of claim 11, wherein execution of the instructions further causes the machine learning system to:

select the one or more subarrays of the array of first pixel values based at least in part on dimensions of a receptive field associated with the first filter, each subarray of the one or more subarrays spanning the dimensions of the receptive field.

13. The machine learning system of claim 12, wherein the selecting of the one of more subarrays of the array of first pixel values comprises:

determining that the differences detected between one or more first pixel values in the array of first pixel values and one or more second pixel values in the array of second pixel values exceed a threshold amount, each of the one or more subarrays including at least one of the one or more first pixel values.

14. The machine learning system of claim 11, wherein the generating of the array of first activations comprises:

applying an activation function to the one or more newly computed first activations.

15. The machine learning system of claim 11, wherein execution of the instructions further causes the machine learning system to:

apply a second filter associated with a second layer of the CNN to one or more subarrays of the array of first activations based at least in part on the one or more newly computed first activations, the application of the second filter to the one or more subarrays of the array of first activations producing one or more newly computed second activations, respectively; and generate an array of second activations associated with the second layer of the CNN based on the one or more newly computed second activations and one or more cached second activations associated with the image n−1.

16. The machine learning system of claim 15, wherein each of the one or more subarrays of the array of first activations includes at least one of the one or more newly computed first activations.

17. The machine learning system of claim 11, wherein execution of the instructions further causes the machine learning system to:

receive an array of third pixel values representing an image n+1 that follows the image n in the sequence of images;

detect differences between the array of third pixel values and the array of first pixel values;

apply the first filter to one or more subarrays of the array of third pixel values based on the differences detected between the array of third pixel values and the array of first pixel values, the application of the first filter to the one or more subarrays of the array of third pixel values producing one or more newly computed second activations, respectively; and generate an array of second activations associated with the first layer of the CNN based on the one or more newly computed second activations and one or more first activations from the array of first activations.

18. The machine learning system of claim 17, wherein the one or more first activations include at least one of the one or more cached first activations associated with the image n−1.

* * * * *